United States Patent [19]

Härtlein

[11] Patent Number: 4,974,325
[45] Date of Patent: Dec. 4, 1990

[54] PORTABLE, MOTOR DRIVEN CUTTING DEVICE, ESPECIALLY MOTOR SAW, HEDGE-SHEARS OR SIMILAR

[76] Inventor: Reinhold Härtlein, Schulstrasse 6, D-8531 Hagenbüchach, Fed. Rep. of Germany

[21] Appl. No.: 369,979

[22] Filed: Jun. 22, 1989

[30] Foreign Application Priority Data

Jun. 23, 1988 [DE] Fed. Rep. of Germany ....... 3821209

[51] Int. Cl.⁵ ..................... B23D 59/00; B23B 29/00; F16C 11/06; F16C 23/04
[52] U.S. Cl. ........................................ 30/383; 30/371; 403/90; 384/192
[58] Field of Search .................. 30/376, 392, 393, 391, 30/394, 371, 381, 383; 403/98; 384/192, 202

[56] References Cited

U.S. PATENT DOCUMENTS

| | | | |
|---|---|---|---|
| 2,027,560 | 1/1936 | Skillman | 384/192 |
| 3,567,262 | 3/1971 | Szkaradek et al. | 384/202 |
| 3,937,306 | 2/1976 | Maslund et al. | 30/383 |
| 4,222,680 | 9/1980 | Browning | 403/90 |
| 4,353,615 | 10/1982 | Kramer et al. | 384/192 |
| 4,568,121 | 2/1986 | Kashima | 403/90 |
| 4,708,510 | 11/1987 | McConnell et al. | 403/90 |
| 4,726,118 | 2/1988 | Mattsom et al. | 30/3.71 |
| 4,767,231 | 8/1988 | Wallis | 403/90 |

Primary Examiner—Douglas D. Watts
Assistant Examiner—Paul M. McHoyrana
Attorney, Agent, or Firm—Jordan and Hamburg

[57] ABSTRACT

Portable, motor-driven cutting device, especially motor saws or hedge-shears with a housing with support handle and operating buttons at the back section and cutting devices at the front section, as well as with at least one operating grip to be set, angled or freely adjustable about a first axis which runs in the main parallel to the cutting plane and which serves to adjust the cutting plane whereby the handle can be adjusted to the housing about at least one additional axis vertical to the cutting plane that locking for the turn and adjusting position about the first axis is effected if facing notches and counter notches of the handle and housing catch form-fit and/or friction tight due to adjusting around the additional axis.

18 Claims, 2 Drawing Sheets

PORTABLE, MOTOR DRIVEN CUTTING DEVICE, ESPECIALLY MOTOR SAW, HEDGE-SHEARS OR SIMILAR

Background of the Invention

The invention refers to a portable, motor driven cutting device, especially power saws or hedge-shears with a housing with support handle and operating buttons at the back section and cutting devices at the front section, as well as with at least one handle to be set, angled and freely adjustable around a first axis which runs in the main parallel to the cutting plane and which serves to adjust the cutting plane.

With such known manual motor saws (refer to DE-PS 28 16 485) a support handle is positioned in the back with buttons to turn the saw on and off. To enable changing of the cutting plane, especially for removing branches or to produce an undercut to fell a tree, this motor saw is equiped with a another handle in the front (operating handle) which is a L-like bow linked setable, and freely adjustable around an axis parallel to the length axis of the housing. To change the cutting position of the cutter or saw blade the setting has to be released. This is done according to the known version, by activating a release lever at the handle leg of the front handle to loosen the lock between the freely adjustable handle and the housing.

The lock is a spring-loaded stop catch in locking position which engages into a toothed wheel firmly connected to the housing. The stop catch can be redrawn from the catch-position of the toothed wheel by activating the release lever connected by a cable cord so that the locking is loosened and the housing and the handle can be turned opposite to each other to change the cutting plane.

In case the position of the cutting plane has to be changed often handling of such a device becomes very laborious. Each change of the cutting plane makes manual activation of the release lever necessary, which is pretensioned by resilience. Thus the hand holding the handle will tire soon. As manual activating of the release levers usually is done with the thumb only the remaining 4 fingers hold the handle; the handling safety of the cutting device is reduced. Additionally, the spring-loaded, in locking position tensioned, stop catch and its connection to the release lever by a cable cord is wearing easily, especially with rough surrounding conditions, corrosion and material fatigue.

The task of the invention was to create a cutting device of the kind mentioned in the beginning, however with comfortable operation, high operating reliability and safety.

This task is solved by a cutting device with all characteristics mentioned before and which comprises the handle and/or the housing being coupled freely adjustable vertical to the cutting plane running axis that locking for the set and freely adjust position is effected regarding the first axis if opposite lying notches and counter notches of the handle and housing come to a form-fit and/or friction tight engagement due to adjusting around the additional axis.

SUMMARY OF THE INVENTION

With this invention a cutting device is created which can be guided by a support handle in the back section and a handle in the front section. The support handle is attached to the housing and can either be integrated in the housing or be made in one piece. The front handle is connected to the housing set and/or freely adjustable around a longitudinal axis and at least an additonal axis.

The adjustability about the longitudinal axis is to change the position of the cutting plane, e.g. the cutter of a motor saw.

To make reliable and safe handling possible, locking of the set and freely adjustable position (however to be released again) about the longitudinal axis is necessary. This is enabled, according to the invention, by at least one more joint connecting the handle with the housing; this joint is equipped with pivotal axes which extend in the main vertical to the cutting plane and around which the housing and handle can either be freely adjusted to or away from each other. This free adjusting around the further axis (or more) is in the main to lock or release the catch.

This invention makes use of the fact that in operation the user usually presses with the support handle towards the cutting devices which are normally fixed to the housing. This pressure makes a counter pressure with the handle necessary and is converted in a swivelling movement by the mentioned joint leading to a limit stop of the housing at the handle. Around the meeting area of housing and handle a simple catch can be equipped, which can be released again by reversing the swivelling motion. This has the advantage that for changing of the cutting plane only one further link joint has to be planed (next to the link joint for the first set or free adjustability about the longitudinal axis) which enables a swivelling motion around an axis vertical to the cutting plane. Such link joints can be produced easily, cheap and be made resistant. Thus, according to this invention the handle and/or the housing can, e.g. be arranged freely adjustable with a rubber device as a link joint around a further axis. The rubber device can, for example, form a vertical section of a "L"-like handle. Opening of the catch can then be done by manually pushing away the handle from the housing. Due to the elasticity of the rubber device the catch closes again after there is no more manual pressure.

With this invention there are various possibilities to realize the first set or free adjustability about the longitudinal axis and the free adjustability about the additional axes. For example couple positions can be provided between handle and housing. To facilitate the structural design the mentioned couple positions are integrated in one single joint device. For such a joint device a socket joint or a self-aligning bearing is suitable which are set up as freely adjustable connection between housing and handle.

On principle socket joints make adjusting movements around all three rotational axes possible. With a self-aligning bearing the handle can be turned while the housing remains stable, whereby the turning axis runs parallel to the cutting plane. At the same time the self-aligning bearing allows, to a certain extend, swivelling movements around at least one more axis which runs through the bearing center and vertical to the cutting plane. Such swivelling movement can suffice to open or close corresponding catches regarding the rotational axis.

For the fixing device there are several versions. It may consist of a toothing, fixed to the housing, surrounding the aforesaid longitudinal axis and a claw fixed at least once to the handle, which engages with toothing when turning the handle to the housing and/or vice versa around the further axis. This leads to especially safe locking during sawing. Another alternative is to realize the fixing device with two rubber pieces, having outside profiled surfaces with one each to the operating handle and the other to the housing. When turning the handle or the housing correspondingly around the further axis the outside surfaces can come together friction tight. For safety during cutting and sawing a pull-back spring should be arranged between handle and housing in such a way that it counters when adjusting the housing away from the handle and/or vice versa around the additional axis. The user wanting to change the cutting plane, may, e.g. release the catch by suddenly turning away the handle from the housing and dislocking the pull-back spring at the same time. Afterwards the handle is returned to tight closing with the housing by the pull-back spring, so that the catch is closed again.

To increase the operating safety and the long life time there is a support shoulder for a projection after the operating handle or housing to the housing respectively operating handle which is developed at the housing respectively handle and which touches if the catch is closed. This helps to take weight off the joint positions for the mentioned set and adjustable handle about the aforesaid longitudinal axis. Otherwise the weight of the device would press onto the joint position when the user lifts the device with the support handle and the linked operating handle, which would increase its failure. With the support shoulder and the projection the joint and link positions can be developed simply and inexpensively.

More advantages, characteristics and details of the invention can be seen from the claims, the following description of a example as well as the drawings.

DESCRIPTION OF THE PREFERRED EMBODIMENTS

Corresponding numerals for different figures indicate parts functioning correspondingly.

Figure 1:
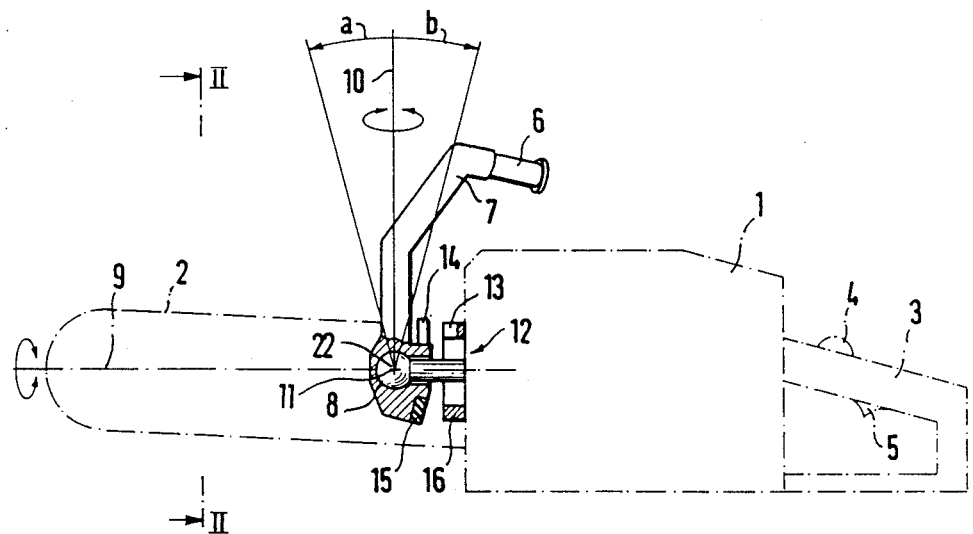
FIG. 1 is a side view of the motor saw with linked operating handle, whereby the motor saw itself is only shown schematically with dotted lines.
Figure 2:
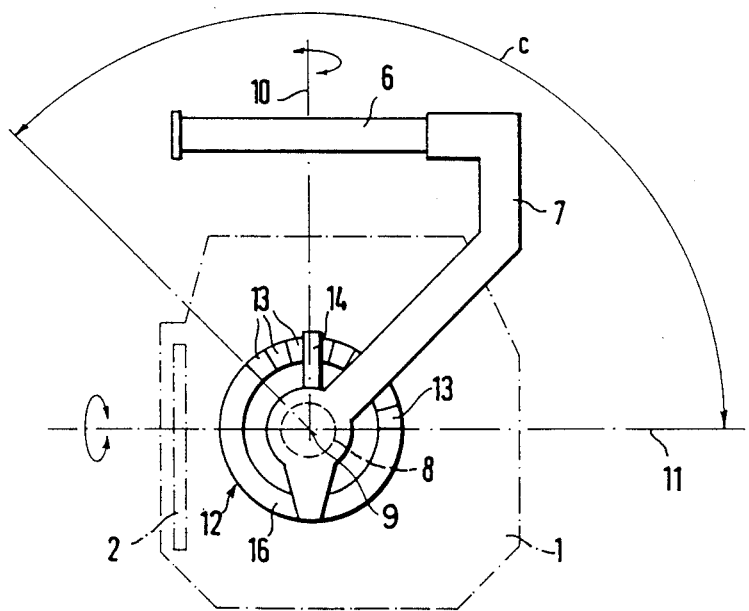
FIG. 2 is a front view according to line II—II in FIG. 1.

According to FIG. 1 and 2 a cutter 2 is fixed to the housing 1 front of the motor saw. At the back of the housing 1 a support handle 3 is located with operating buttons 4,5 to be reachable with the holding hand. Opposite, to the the front of the housing 1 and near the cutter 2 there is a front operating grip 6 with a handle 7. The handle 7 leads to a joint 8 above which the operating grip 6 is fixed freely adjustable to the housing 1.

In the example of FIG. 1 and 2 the joint is realized with a ball-and socket a longitudinal axis 9 joint, which enables adjusting of the operating grip 6 around parallel to the cutting plane of the cutter 2 turning freely or longitudinal axis 9 as well as around the additional pivotal axes 10 and 11. The operating grip 6 is freely adjustable about axis 9 enabling adjusting of operating grip 6 around angle c (refer to FIG. 2) which thereby provides for adjusting the cutting plane of the cutter 2. For fixing the position of the cutting plane there is a lock 12 near the joint 8. The joint (according to FIG. 1 and 2) consists of a notch counter notch pair above the axis 9 and another notch/counter notch pair below this axis.

The upper pair consists of a sprocket wheel 12 firmly fixed to the housing 1 and an opposite laying stop catch which is developed at the lower part of the joint 8 surrounding handle and 7 of the operating grip 6. The pair below the axis 9 is, in the main, made of a rubber piece 15 fixed to the lower edge of the handle 7 and an opposing flush metal disk 16 which protrudes from the front of the housing 1 towards the rubber piece.

If the operating grip 6 is adjusted around the middle position shown in FIG. 1 (in which lock 12 is opened) to the front around the additional swivel/pivotal axis 11 (refer to FIG. 2) along the angle a (refer to FIG. 1) the rubber part is brought in friction engaged connection with the metal disk 16. This friction engaged connection leads to fixing and thus locking of the turn and adjusting position of operating grip 6 around the axis 9. The rubber piece 15 has the additional advantage that the impact, onto the metal disc 16 is cushioned and thus the hand holding the operating grip 6 is eased. If the handle, starting from the mentioned middle position, is adjusted backwards around pivotal axis 11 along angle b, the stop catch 14 locks in a space of the sprocket wheel 13 at the housing wall. Thus form-fit locking of the cutter 2 cutting plane is achieved. With this example there are two alternative lockable notch/counter notch pairs 13, 14 and 15, 16 planned to achieve locking 12. When adjusting forwards along angle a one pair and when adjusting backwards along angle b the other pair will catch into other. This mechanism is adjusted especially to the operation of a motor saw and thus enables effective and safe working.

Figure 3:
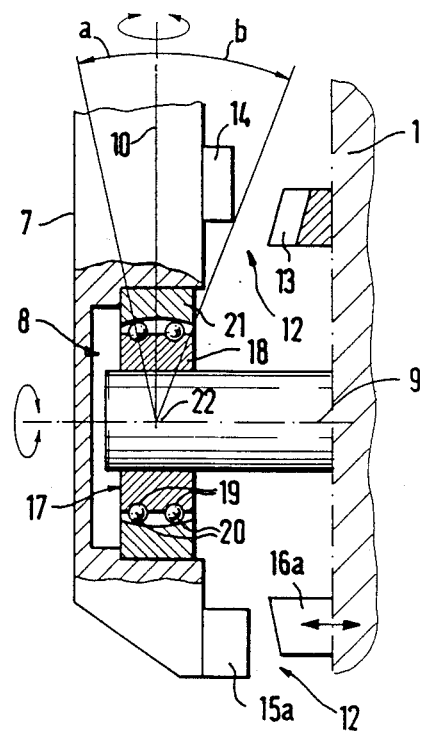
FIGS. 3–5 are enlarged side views of different fixing angles of linking of the operating handle for the housing.

According to the enlarged section of FIG. 3 there is a self-aligning ball bearing 17 with inside ring 18 with grooves 19 for balls 20 and an outside ring 21 which creates a hollow ball, ground roller path for the balls 20 planned as joint 8 for the operating grip resp. its handle 7. With such self-aligning ball bearings the inside ring 18 can be adjusted around the bearing center while the outside ring remains. That means that the handle 7 of the operating grip can be moved to the front resp. back around the bearing center 22 along angle a resp. b, so that the upper resp. lower notch/counter notch pair 15, 16 resp. 13, 14 can lock into each other. The upper notch/counter notch pair 13, 14 corresponds to the ones shown in FIG. 1 and 2. However, the lower notch/counter notch pair differs from FIG. 1 and 2 as follows:

At the lower edge of the handle 7 of the operating grip a shock absorbing rubber piece 15a is fixed which is engageable with a buffer 16a at the opposite side of the housing front when swivelling towards angle a. As marked with a double arrow in FIG. 3 the distance of the buffer 16a to the rubber piece 15a can be adjusted; by that it can be achieved that angle a, in whose direction the handle can be swivelled forwards, is not too large.

Figure 4:
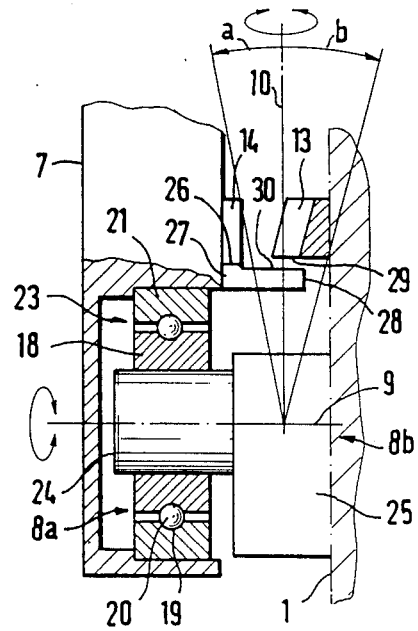

According to FIG. 4 a separate joint 8a is provided for the adjusting about axis 9 also for the additional adjusting around axes 10, 11 (joint 8b). The first joint 8a is realized by a deep groove ball bearing 23 which enables only turning around the axis 9. The deep groove ball bearing 23 is attached to a projection 24 which protrudes from a rubber piece 25 and is formed onto it. The rubber piece 25 forms the second, separable joint 8b with which the handle 7 of the operating grip can be adjusted forth resp. back towards angle a resp. b. The notch/counter notch pair 13, 14 above the first freely adjustable axle 9, correspond to the ones shown in FIG. 1-3. Additionally, a support shoulder 28 is formed at the lower, horizontal edge 26 of the stop catch 14 as well as at the close by edge 27 of the handle 7, which protrudes horizontally towards the housing front when not locked. If the handle is adjusted along the angle a the lower side surface 29 of the protruding sprocket wheel 13 touches the upper side surface 30 of the support shoulder 28. This results in easing of the rubber joint 8b (at the handle being adjusted away from the housing front). Due to the elasticity of the rubber piece 25, with which the joint 8b is realized such a joint always keeps the middle position, resp. wanting to return to this position. This facilitates achieving of the middle position for the person operating the device.

Figure 5:
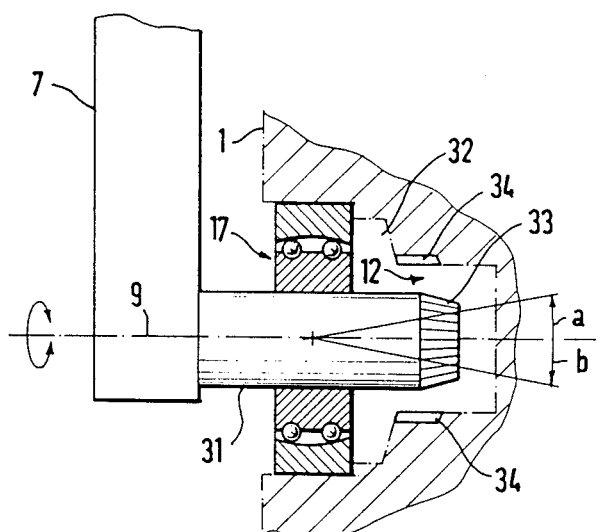

In the version according to FIG. 5 a pin 31 protrudes horizontally from the lower end of the handle 7 and reaches into one of the recesses 32 in the front of the housing 1. Onto the pin 31 a self-aligning ball bearing 17 is attached around the middle. In the main, it has the same functions as the one in FIG. 3. The free end of the extension 1 is equipped with a spur pinion toothing 33 which is surrounded by a complementary inside toothing 34 in such a way that when turning in direction of angle a resp. b the spur pinion toothing 33 and the inside toothing 34 catch into each other.

The invention is not limited to the above embodiments. It is possible to constructively change the locking by e.g. using a form-fit locking with a claw coupling or a punched disk with axial or radial recesses into which a bar catches separately. Instead of a form-fit locking it is possible to use a friction tight locking with disk brake or an equally acting device.

I claim:

1. A portable motor-driven cutting device comprising a housing means, an elongated cutting means extending along an elongate axis, said cutting means extending from said housing means, a handle means, mounting means on said handle means and on said housing means mounting said handle means on said housing means, said mounting means having a rotational axis parallel to said elongate axis and a pivotal axis perpendicular to said rotational axis, said mounting means providing for rotational movement of said handle means about said rotational axis and for pivotal movement of said handle means about said pivotal axis, said handle means being manually rotatable about said longitudinal axis to a desired rotated adjustable position, and engaging means on said handle means and on said housing means having an engaged position and a disengaged position, said handle means being manually pivotal about said pivotal axis between an engageable position in which said engaging means is engaged to preclude rotation of said handle means about said longitudinal axis and a disengageable position in which said engaging means is disengaged and said handle means is free to be manually rotatable about said rotational axis, whereby an operator is able to thereby manually rotate said handle means to a desired rotational position while said handle means is in said disengageable position and then lock said handle means in said desired position by manually pivoting said handle means to said engageable position.

2. A portable motor-driven cutting device according to claim 1, wherein said pivot axis intersects said longitudinal axis.

3. A portable motor-driven cutting device according to claim 1, wherein said mounting means comprises a ball and socket joint.

4. A portable motor-driven cutting device according to claim 1, wherein said mounting means comprises a self-aligning ball bearing means.

5. A portable motor-driven cutting device according to claim 1, wherein said mounting means comprises a resilient member which resiliently flexes when said handle means is moved to said adjusted position.

6. A portable motor-driven cutting device according to claim 1, wherein said engageable means comprises a first engageable part means on said handle means and a second engageable part means on said housing means, at least one of said engageable part means being disposed at least partially annularly relative to said longitudinal axis.

7. A portable motor-driven cutting device according to claim 6, wherein one of said engageable part means comprises groove means, the other of said engageable part means comprising projection means engageable in said groove means when said handle means is in said engageable position.

8. A portable motor-driven cutting device according to claim 6, wherein at least one of said engageable part means is made at least partially of a resilient material.

9. A portable motor-driven cutting device according to claim 1, wherein said handle means has one adjusted position diametrically opposite another adjusted position relative to said longitudinal axis, said engageable means having first engageable parts which are engageable with each other when said handle means is in said one adjusted position, said engageable means having second engageable parts which are engageable with each other when said handle means is in said other adjusted position, said second engageable parts being disengaged from each other when said handle means is in said one adjusted position, said first engageable parts being disengaged from each other when said handle means is in said other adjusted position.

10. A portable motor-driven cutting device according to claim 9, wherein said first and second engageable parts are located diametrically opposite one another relative to said longitudinal axis.

11. A portable motor-driven cutting device according to claim 9, wherein said first and second engageable parts are both disposed on one side of said longitudinal axis.

12. A portable motor-driven cutting device according to claim 9, wherein one section of said first engageable parts and one section of said second engageable parts are disposed juxtaposed to one another in a generally L-shaped configuration.

13. A portable motor-driven cutting device according to claim 1, wherein said engageable means comprises friction parts which frictionally engage one another when said handle is in said adjusted positions to frictionally retain said handle in said engaged position.

14. A portable motor-driven cutting device according to claim 1, wherein said handle means is freely adjustable into a plurality of desired adjusted positions by effecting relative movement between said handle means and said housing without requiring any separate locking or unlocking operation.

15. A portable motor-driven cutting device according to claim 14, wherein said engageable means has resilient cushionary parts.

16. A portable motor-driven cutting device according to claim 1, wherein said mounting means comprises a resilient member extending from said housing means, said handle means being rotatably mounted on said resilient member, said resilient member being resiliently flexed as said handle means is adjusted to said engageable position.

17. A portable motor-driven cutting device according to claim 1, wherein said mounting means comprises a shaft member fixed to said handle means, said mounting means rotatably mounting said shaft member on said housing means, said engageable means having one engageable part located on one longitudinal end portion of said shaft member.

18. A portable motor-driven cutting device according to claim 17, wherein said housing means has an internal opening into which said shaft extends, said engageable means having another engageable part located on said opening.

* * * * *